F. A. BECKER AND A. P. ANDLAUER.
RIVETING TOOL.
APPLICATION FILED DEC. 27, 1920.
1,417,711.
Patented May 30, 1922.
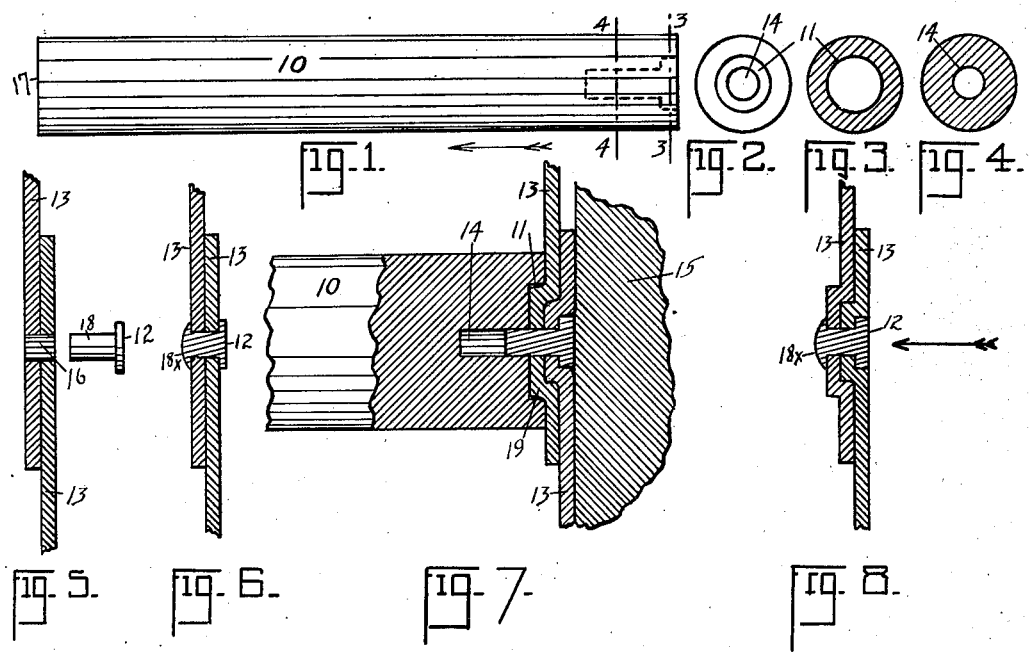
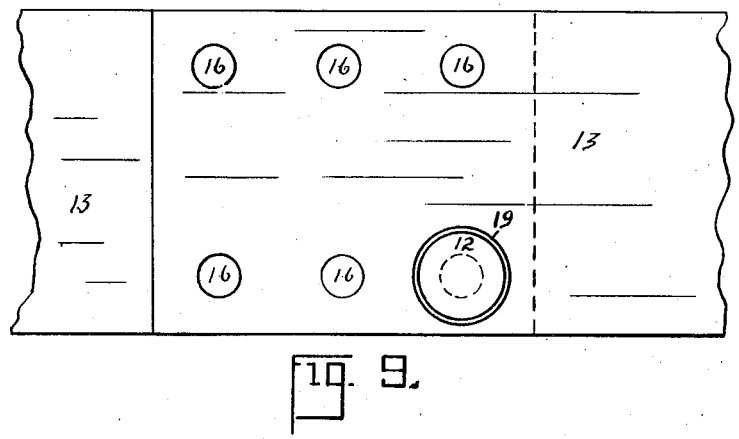
WITNESS:
Thos. V. Peters
INVENTORS
Frank A. Becker and
Albert P. Andlauer
BY
William C. Edwards, Jr.
ATTORNEY

UNITED STATES PATENT OFFICE.

FRANK A. BECKER AND ALBERT P. ANDLAUER, OF KANSAS CITY, MISSOURI.

RIVETING TOOL.

1,417,711.   Specification of Letters Patent.   Patented May 30, 1922.

Application filed December 27, 1920. Serial No. 433,301.

*To all whom it may concern:*

Be it known that we, FRANK A. BECKER and ALBERT P. ANDLAUER, citizens of the United States, and residents, respectively, of Kansas City, in the county of Jackson and State of Missouri, have invented certain new and useful Improvements in a Riveting Tool, of which the following is a description, referring to the drawings which accompany this specification.

The invention relates to a tool, useful in the sheet metal trades for riveting operations, the principal purpose of the invention being to provide a tool which in drawing a rivet through a plurality of thicknesses of sheet metal, serves to draw the metal under action of the composite rivet head, bucker up and tool in combination, which in effect countersinks the metal whereby the head of the rivet lies in the plane of the outer sheet of metal in the combination and when the shank of the rivet has been set on the reverse side, a smooth surface is obtained on the outer sheet in counter distinction to customary practice where the rivet head projects and remains as an obstruction, which in certain designs calling for flush surfaces would prove objectionable.

Sheet metal of light gauges is not susceptible of ordinary countersinking, with satisfactory results; in our invention, the countersinking removes no metal, but leaves all the metal depressed beneath the rivet head which serves to better bind and make secure the riveted joint.

In the drawings, Fig. 1 shows a side elevation of the rivet tool. Fig. 2 is an end view of the tool looking in the direction of the arrow, Fig. 1. Fig. 3 is a sectional view taken along the line 3—3 Fig. 1. Fig. 4 is a sectional view taken along the line 4—4 Fig. 1. Fig. 5 shows two sheets with a registering hole through same and a rivet arranged to pass through the hole in the sheets to secure same when finally riveted together. Fig. 6 shows two sheets riveted together in the customary manner, showing the rivet head projecting beyond the plane of the outside sheet. Fig. 7 is a fragmentary sectional view of the operative end of our tool, a rivet, a bucker up and two sheet metal sheets as lapped and arranged for instance in tank wall or chute constructions and showing the countersunk draw obtained in practice. Fig. 8 shows a sectional view of the parts seen in Fig. 7, when the rivet has been set. Fig. 9 is a fragmentary plan view showing two lapped sheets, holes for rivets and a top flush view of a rivet head, similar to that disclosed in Fig. 8, looking in the direction of the arrows. Similar numerals of reference indicate corresponding parts throughout the several figures of the drawings.

Referring to the drawings, 10 represents the body of the tool, the operative base is provided with a countersunk recess 11 in diameter equal to or slightly in excess of the diameter and size of a rivet head 12 plus twice the thickness of the plural sheets of sheet metal 13, which it is desired to rivet together. Concentric with the recess 11 is a hole 14 of reduced diameter to the recess 11, this hole being of the proper size to receive and guide the shank 18 of the rivet during drawing operations. The sheets 13 are lapped as disclosed in Fig. 7 and so that holes 16 in the assembled sheets 13 are brought into registry and the rivet shank 18 is then passed through such registering holes 16 and the bucker up 15 is positioned against the rivet head 12. The hole 14 of the tool is next sleeved on the shank 18 of the rivet, one or more blows are then struck upon the head of the tool at 17. The head of the rivet then forces the metal of the sheets 13 to draw as at 19 within the base recess 11 of the tool and in the countersunk manner disclosed in Figs. 7, 8 and 9. The shank 18 of the rivet is then upset as seen at 18$^x$ Fig. 8 which completes the riveting operation.

Such modifications may be employed as lie within the scope of the appended claim.

Having thus fully described our invention what we now claim as new and desire to secure by Letters Patent is:

A riveting tool, including a shank, a recess at one end of said shank in diameter equal to or slightly in excess of the diameter of a rivet head plus twice the thickness of a desired assemblage of sheet metal and an inner hole concentric with and connecting to said recess.

FRANK A. BECKER.
ALBERT P. ANDLAUER.

Witnesses:
CAMERON MCCRACKIN,
E. J. FLINN.